United States Patent [19]

Eschwey et al.

[11] 4,221,685
[45] Sep. 9, 1980

[54] WATER-DISPERSED FILM-FORMING LACQUER CONTAINING AIR-DRYING ALKYD RESINS AND ETHYLENE OXIDE ADDUCTS OF HYDROPHOBIC COMPOUNDS

[75] Inventors: Helmut Eschwey, Dusseldorf-Benrath, Fed. Rep. of Germany; Joachim Galinke, deceased, late of Langenfeld, Fed. Rep. of Germany, by Renate Galinke, nee Jansen, heir; Norbert Wiemers, Monheim-Baumberg, Fed. Rep. of Germany

[73] Assignee: Henkel Kommanditgesellschaft auf Aktien (Henkel KGaA), Düsseldorf-Holthausen, Fed. Rep. of Germany

[21] Appl. No.: 966,368

[22] Filed: Dec. 4, 1978

[30] Foreign Application Priority Data

Dec. 5, 1977 [DE] Fed. Rep. of Germany ....... 2754141

[51] Int. Cl.² .......................... C09D 3/64; C09D 5/02
[52] U.S. Cl. ................................ 260/22 A; 260/22 T; 260/29.2 E; 260/29.2 UA; 428/430
[58] Field of Search .............. 260/22 A, 22 T, 29.2 E, 260/29.2 UA; 428/430

[56] References Cited

U.S. PATENT DOCUMENTS

| | | | |
|---|---|---|---|
| 3,077,459 | 2/1963 | Hershey et al. | 260/22 A |
| 3,804,787 | 4/1974 | Nicks et al. | 260/22 R |
| 3,879,327 | 4/1975 | Burke | 260/29.2 E |
| 4,051,089 | 9/1977 | Tobias et al. | 260/29.2 UA |
| 4,122,051 | 10/1978 | Friberg et al. | 260/22 A |

FOREIGN PATENT DOCUMENTS

| | | | |
|---|---|---|---|
| 39-14627 | 7/1964 | Japan | 528/1 |
| 1007834 | 10/1965 | United Kingdom | 260/29.2 UA |

*Primary Examiner*—Ronald W. Griffin
*Attorney, Agent, or Firm*—Hammond & Littell, Weissenberger and Muserlian

[57] ABSTRACT

A water-dispersed film-forming vehicle suitable for lacquers is disclosed. The vehicle consists of an aqueous dispersion of an air-drying alkyd resin dispersed by the use of a surfactant consisting of an adduct of allyl glycidyl ethers and ethylene oxide units onto a hydrophobic aliphatic radical having a replaceable hydrogen atom, optionally substituted by an aryl radical. The hydrophobic aliphatic radical may be a fatty-acid radical of from 6 to 26 carbon atoms and the aryl substituent is a phenol. The adduct includes 2 to 10 allyl glycidyl units and 5 to 25 ethylene oxide units per mol. The water-based dispersion diluent in which the alkyd resin is dispersed may include pigments, siccatives for the alkyd drying resin and optionally processing-aid solvents.

13 Claims, No Drawings

WATER-DISPERSED FILM-FORMING LACQUER CONTAINING AIR-DRYING ALKYD RESINS AND ETHYLENE OXIDE ADDUCTS OF HYDROPHOBIC COMPOUNDS

FIELD OF THE INVENTION

The present invention relates to aqueous dispersions of air-drying alkyd resins suitable as film-formers for lacquer vehicles. More particularly, such aqueous dispersions are based on such resins dispersed by the aid of non-ionic surfactants which are adducts of allyl glycidyl ethers and ethylene oxide with hydrophobic moieties.

BACKGROUND OF THE INVENTION

It is known to use air-drying alkyd resins having high acid numbers for the production of aqueous lacquers and other film-forming agents. Such alkyd resins, having high acid numbers, have good water solubility in the form of their amine salts. Such alkyd resins and film-forming systems based thereon, have the disadvantages of unsatisfactory resistance to water and water vapor, and contain considerable amounts of volatile amines and often toxic auxiliary solvents. While drying and curing, layers formed from such high acid number resins release their amines and solvents which are undesirable sources of pollution to the adjacent atmosphere. To reduce such pollution, it is often necessary to carry out such steps in specially designed apparatus to trap and recover these toxic substances. Such apparatus is expensive and the cost of such apparatus overshadows any savings from the recovered solvents.

It is also known to modify film-forming materials by the incorporation of hydrophilic groups, particularly polyethylene glycol chains into the resin molecule in such a manner that self-emulsifying alkyd resins or melamine resins result.

It is also known that even without direct incorporation into the resin molecule, it is possible to use polyglycol ether derivatives, such as the adducts of ethylene oxide with fatty alcohols, as low molecular-weight, nonionic emulsifiers. In such cases, however, portions of the hydrophilic radical remain active in the film. Due to the hydrophilic nature of the remaining active radical, the resultant film possesses a susceptibility to water penetration. A marked reduction in the hardness of the resultant film is also noted.

OBJECTS OF THE PRESENT INVENTION

An object of the present invention is the development of water-dispersed or dispersable aqueous film-forming vehicles suitable for lacquers and which are superior to the known prior art systems.

A further object is to provide film coatings which have characteristic properties of vastly improved resistance to water penetration, moisture diffusion and have superior film hardness.

Another object of the present invention is the development of such aqueous film-forming systems which can be used to coat various substrates including glass, wood, metals, etc., and which do not use objectionable amounts of polluting volatile organic solvents.

A further object of this invention is the development of a water dispersed film-forming vehicle suitable for lacquer bases and such lacquers comprising a water-insoluble air-drying alkyd resins, surfactants consisting essentially of adducts of allyl glycidyl ether units and ethylene oxide units with a hydrophobic aliphatic moiety having a replaceable hydrogen atom selected from the group consisting of long-chain aliphatic groups and long-chain alkyl phenyl groups; dispersed in a water-based dispersion diluent. These and other objects of the present invention will become more apparent as the description of the invention is elaborated below.

THE INVENTION

The above objects have been achieved by the development of water-dispersed film-forming vehicles comprising water-insoluble air-drying alkyd resins, a surfactant consisting essentially of adducts of allyl glycidyl ether units and ethylene oxide units with a hydrophobic moiety selected from the group consisting of long-chain aliphatic or long-chain alkylphenyl moieties dispersed in water-based diluent.

The surfactant consists of at least one adduct of allyl glycidyl ether and ethylene oxide with a hydrophobic moiety source selected from the group consisting of fatty acids, fatty alcohols, fatty amines, fatty-acid amides and alkyl phenols. The fatty-acid groups and said alkyl groups of these sources contain from 6 to 26 carbon atoms. The adducts must include 2 to 10 allyl glycidyl units and 5 to 25 ethylene oxide units per mol of the adduct compound.

The surfactant employed, therefore, consists of the adduct of from 2 to 10 allyl glycidyl ether units and from 5 to 25 ethylene oxide units adducted to one unit of a hydrophobic compound having a replaceable hydrogen selected from the group consisting of alkanoic acids having 6 to 26 carbon atoms,
alkenoic acids having 6 to 26 carbon atoms,
alkadienoic acids having 6 to 26 carbon atoms,
alkanols having from 6 to 26 carbon atoms,
alkenols having from 6 to 26 carbon atoms,
mono-alkylamines having from 6 to 26 carbon atoms,
mono-alkenylamines having from 6 to 26 carbon atoms,
alkanoic acid amides having from 6 to 26 carbon atoms,
alkenoic acid amides having from 6 to 26 carbon atoms,
alkylphenols having from 6 to 26 carbon atoms, in the alkyl, and mixtures thereof.

The water-dispersed film-forming vehicle contains air-drying alkyd resins having film-forming properties which are water-insoluble and have an acid number in the range of 5 to 40, and a fatty-acid content in the range of 25 to 80% by weight of said resin calculated as fatty-acid glyceride. Preferred among such resins are those which have an acid number in the range from 5 to 25 and optionally about 10±2 and a preferred fatty-acid content in the range of 45% to 70%.

The major portion of the dispersal diluent is, of course, water.

To the water may be added various adjuvants for the preparation of suitable lacquer vehicles including pigments, siccatives, processing aids including small amounts of solvents. The siccative agents are those commonly used to control the drying rate of the air-drying alkyd resins.

According to preferred form of the invention, the aqueous film-forming dispersions contain nonionic adducts of ethylene oxide and allyl glycidyl ether with fatty acids, fatty alcohols, fatty amines, fatty-acid amides or alkyl phenols containing 6 to 26 carbon atoms with (a) 2 to 10 allyl glycidyl ether units, and
(b) 5 to 25 ethylene oxide units per mol of said fatty derivative or alkyl phenols.

The fatty acids can be derived from natural or synthetic fats. Those that are suitable as starting components contain chains of approximately 6 to 26, usually, 12 to 18 carbon atoms. They may also contain double bonds and are primarily used in the form of mixtures derived from naturally occurring fats. Synthetic fatty acid derivatives may also be used, including branched-chain fatty acids.

Useful as starting substances for the preparation of the adducts which form the special nonionic surfactants are the fatty alcohols of 6 to 26 carbon atoms and, preferably, those having aliphatic chains of 12 to 18 carbon atoms. Such fatty alcohols are usually obtained by reduction from the acids of the above-mentioned natural fats and, also, by the reduction of the synthetic fatty acids. The so-called "Oxo-alcohols" may also be used.

In addition, fatty amines and fatty-acid amides are also sources for the hydrophobic, long-chain, aliphatic compounds to which the allyl glycidyl ether and ethylene oxide are added to form the nonionic adducts. The same chain-length preferences stated for the fatty acids and alcohols apply to the amines and amides which are prepared from the respective fatty acids and alcohols by well-known reactions. The above-mentioned fatty acids and derivatives used as starting materials for the preparation of the nonionic surfactants relating to this invention are commercially available.

Among the alkyl phenols suitable for preparing the nonionic adducts are those containing, preferably, 6 to 12 carbon atoms in the alkyl moiety, and, those derived from phenol itself, are preferred. Among these, nonyl phenol has proved to be an excellent starting material.

The addition of the epoxy compounds, i.e., the ethylene oxide and allyl glycidyl ethers, to the above-mentioned hydrophobic compounds, the fatty derivatives or alkyl phenols, is carried out under the catalytic influence of alkalis, preferably, alkali metal lower alcoholates such as sodium or potassium methylate or butylate.

In general, the epoxides are added in the form of a mixture of both in proper proportions as desired. The hydrophilic moiety of the nonionic surfactants can be in the form of block polymer chains as well as any other statistical distribution of the ethylene oxide and allyl glycidyl ether units. With regard to the fatty acids and fatty alcohols, those having the preferred range of 12 to 18 carbon atoms are used for economic reasons since mixtures of such fatty acids are commonly commercially available. These contain the olefinic double bonds as present in the naturally occurring fats.

With regard to the alkyl phenol starting materials, they may contain one or two phenolic OH groups in the molecule. Such poly-hydroxyl alkyl phenols, which are commercially available, are also suitable as starting materials.

The suitable nonionic surfactant compounds of the invention are advantageously used in a quantity of approximately 0.5 to 10, preferably, 1 to 8% (by weight) relative to the total resin constituent. The determination of the quantity of surfactant, to be used in the aqueous dispersions of this invention is made in accordance with empirical considerations rather than purely stoichiometric calculation. One skilled in the art can determine the desirable amount of surfactant to be added by routine experimentation based upon the nature of the final lacquer product and the viscosity desired. An economic consideration is the degree of water dispersion of the vehicle as furnished to the user. If insufficient water is used the vehicle is much too viscous for convenient dilution prior to application to the substrate to be coated. Too much water, of course, affects the economics of shipping and may not have sufficient viscosity or spreading characteristics for certain modes of application. However, the preferred range for each surfactant-resin combination can easily be determined once a decision has been made as to a marketable viscosity and the amount of water in which the product is to be dispersed to present an acceptable product.

For the film-forming element of the water-dispersible vehicles, those alkyd resins that cannot be converted into a form that is soluble in water or can be diluted with water upon amine neutralization, may be used.

The term—air-drying alkyd resins—as used herein, refers to those alkyd resins which can be converted to the cross-linked state by the action of oxygen, preferably, atmospheric oxygen, The rate of such "drying", "curing" or cross-linking of these resins, is subject to additional control by the presence of siccatives.

The suitable air cross-linkable alkyd resins, which are useful film-formers for the present invention, are those which until now were normally applied via organic solvents. These suitable alkyd resins have an acid number of about 5 to 40, preferably, from about 10 to 25. Their fatty acid content must be between 25 and 80% and, preferably, should be between 45 and 70% by weight, as is generally the case with air-drying alkyd resins. The percentage is calculated as the fatty acid glyceride. In general, enough resin is used so that the finished, aqueous dispersion contains approximately 30 to 70% of resin solids. Again, the exact percentage is determined by the commercial requirements for marketable viscosity and dilution of the dispersion.

In general, the film-forming lacquer vehicles according to this invention, contain

| Air-drying resins | 30 to 70% |
|---|---|
| Nonionic surfactant adduct | 0.15 to 7% |
| Water-based diluent | to 100% |

Thus, more particularly, the water-dispersed film-forming vehicles of this invention are comprised of
(a) from 30 to 70% by weight, based upon the total weight of the aqueous dispersion of at least one air cross-linkable alkyd resin;
(b) from 0.15 to 7% by weight of said aqueous dispersion of a surface-active compound which is the addition product of 2 to 10 allyl glycidyl units and 5 to 25 ethylene oxide units per mol of a hydrophobic moiety from a source selected from the group consisting of fatty acids, fatty alcohols, fatty amines, fatty-acid amides and alkyl phenols wherein said aliphatic groups of said fatty source has a chain of from 6 to 26 carbon atoms and said alkyl groups of said alkylphenol contain from 6 to 26 carbon atoms and preferably in the case of fatty acids from 8 to 18 carbon atoms in straight or branched chains and preferably in the case of the alkyl groups contain from 6 to 12 carbon atoms;
(c) the remainder being a water-based vehicle comprising an aqueous liquid-phase containing primarily water and, optionally, admixed pigments, siccatives and adjuvant solvents.

The production of the dispersions of this invention is effected, in accordance with conventional dispersing or emulsifying methods, at temperatures between about 20° and 100° C., and at the temperatures above 100° C. optionally under pressure.

Certain solvents that are water-miscible, or, at least, partially soluble in water, such as ethylene glycol monobutyl ether or butanol or comparable solvents, may be employed in small amounts in the preparation of the dispersions. Also, advantageously small amounts of organic solvents which are not miscible with water, such as test benzene or xylene, may be employed. Since these organic solvents are processing aids useful in the steps of properly subdividing the alkyd resins, pigments or driers, they are used in proportions which do not exceed 15% by weight and, more particularly, do not exceed 10% by weight of the final dispersion.

Occasionally, it is useful for purposes of stabilization to add to the dispersions small amounts of volatile, basic nitrogen compounds such as ammonia or secondary or tertiary aliphatic amines including dimethylethanolamine, triethylamine, diethylamine, butylethylamine, and the like. These compounds should not exceed a quantity of 2% by weight of the final dispersion.

The dispersions in accordance with this invention are oil-in-water emulsions which can be diluted to an unlimited extent with water. By contrast to the numerous known water-dilutable, amine-neutralized alkyd resins systems, the dispersions of this invention, even in the absence of auxiliary organic solvents show no maximum in the dilution curve, i.e., no viscosity anomaly (see, e.g., E. Huttman et al. *Plaste und Kautschuk* (Plastics and Rubber) 17, p. 202, (1970).

The dispersions, according to the invention, can be pigmented by conventional methods and mixed with siccatives. In the absence of organic adjuvant solvents, water-soluble or conventional, commercially available dry substances that can be emulsified in water are used to advantage; in the presence of nonpolar organic adjuvant solvents, conventional metal salts such as naphthenates and/or octoates of heavy metals, such as lead and cobalt or similar substances, can be used also.

The dispersions of this invention can be used for the coating of varied substrates and materials such as wood, glass or metals including aluminum, iron, steel and the many commonly lacquered alloys. In addition, because of the good resistance to moisture, the films of this invention can be used to protect coated substrates from the ravages of moist air as well as from complete immersion in water.

After air-drying, the films of this invention show excellent water resistance as well as a high degree of hardness. With respect to water resistance they are superior to the conventional lacquer emulsions based on inactive emulsifying agents and to the water-dilutable amine-neutralized lacquer systems based on alkyd resins having high acid numbers.

It must also be emphasized that the resins resulting from the present invention have the advantage of requiring little or no volatile organic solvents, amines or ammonia, which, if present, are present in extremely low amounts, thus easily complying with the presently acceptable anti-pollution standards.

The invention will be further exemplified by the appended examples including therein formulae yielding the best mode dispersions of this invention and resulting in the superior films of this invention for coating substrates and the coated substrates of this invention. All parts, proportions and percentages as stated herein are by weight unless otherwise specified.

EXAMPLES

The following alkyd resins, marked I-III, were used for the preparation of the dispersions according to the invention.

Alkyd Resin I

Alkyd resin modified with tall oil, having an oil content of 66% by weight, a content of phthalic acid anhydride of 24% by weight as well as an acid number of 10.

Alkyd Resin II

Alkyd resin modified with linseed oil, having an oil content of 50% by weight, a phthalic acid anhydride content of 32% by weight as well as an acid number of 10.

Alkyd Resin III

Alkyd resin modified with soybean oil, having an oil content of 60% by weight, a phthalic acid anhydride content of 28% by weight as well as an acid number of 12.

Comparison Alkyd Resin (a) (comparison with the state of the art technology)

Alkyd resin modified with vegetable fatty acids having an oil content of 50% by weight, a phthalic acid anhydride content of 19% by weight as well as an acid number of 48. Comparison alkyd resin (a) was in the form of a 63% solution in ethylene glycol monobutyl ether.

The following emulsifying agents, which were prepared in a well-known manner, were used for the preparation of the dispersions. To this end, the epoxide compounds were reacted with the previously added fatty alcohol, phenol or fatty amine, under nitrogen in the autoclave, using 2% by weight of sodium methylate as catalyst, calculated on the phenol. The reaction components were either used in mixtures or added one after the other. The reaction time was 6 hours in all cases.

Emulsifying Agent A

Addition product of 1 mol of nonyl phenol with a mixture of 3 mols of allylglycidyl ether and 15 mols of ethylene oxide reacted at 165° C. and 15 atmospheres.

Emulsifying Agent B

Addition product of 1 mol of nonyl phenol with a mixture of 7 mols of allylglycidyl ether and 20 mols of ethylene oxide reacted at 165° C. and 15 atmospheres.

Emulsifying Agent C

Addition product of 1 mol of hexadecyl alcohol with (a) 20 mols of ethylene oxide and (b) 5 mols of allylglycidyl ether reacted at 165° C. and 15 atmospheres.

Emulsifying Agent D

Addition product of 1 mol of decylamine with (a) 3 mols of allylglycidyl ether and (b) 10 mols of ethylene oxide reacted at 140° C. and 10 atmospheres.

Emulsifying Agent E

Addition product of 1 mol of nonyl phenol with a mixture of 5 mols of allylglycidyl ether and 20 mols of ethylene oxide reacted at 165° C. and 15 atmospheres.

The following commercially available emulsifying agent was used for the comparison:

Comparison Emulsifying Agent

Conversion product of 1 mol of nonyl phenol with 15 mols of ethylene oxide reacted at 165° C. and 15 atmospheres.

Preparation of the Dispersions

The alkyd resin, emulsifying agent, water, nitrogen base and, if desired, the organic adjuvant solvents, were added together and heated to 80° C. Then, the mixture was dispersed, using a high-speed agitator (10,000 rpm). The dispersions were mixed at room temperature with the amounts of cobalt and lead siccative normally used for the conventional alkyd resins. 0.1 part cobalt naphthenate and 0.9 part lead naphthenate (calculated as the metal) were used, per 100 by weight solid resin. The dispersions, according to the invention, which could be diluted with water at any ratio, had the following composition:

| Example 1 | Parts by weight |
|---|---|
| alkyd resin 1 | 49.0 |
| emulsifying agent A | 1.0 |
| triethylamine | 1.0 |
| test benzene (145°-200° C. boiling range) | 5.0 |
| water | 44.0 |

| Example 2 | Parts by weight |
|---|---|
| alkyd resin 1 | 39.0 |
| emulsifying agent B | 1.0 |
| aqueous ammonia, 36% by weight NH$_3$ | 1.0 |
| test benzene (145°-200° C. boiling range) | 10.0 |
| water | 49.0 |

| Example 3 | |
|---|---|
| alkyd resin 2 | 58.5 |
| emulsifying agent C | 1.5 |
| triethylamine | 1.5 |
| test benzene (145°-200° C. boiling range) | 10.0 |
| water | 28.5 |

| Example 4 | |
|---|---|
| alkyd resin 2 | 49.0 |
| emulsifying agent D | 1.0 |
| triethylamine | 1.0 |
| water | 49.0 |

| Example 5 | |
|---|---|
| alkyd resin 3 | 49.0 |
| emulsifying agent E | 1.0 |
| aqueous ammonia, 36% by weight NH$_3$ | 1.0 |
| test benzene (145°-200° C. (boiling range) | 15.0 |
| water | 34.0 |

| Comparison Example (i) | Parts by weight |
|---|---|
| alkyd resin 1 | 49.0 |
| comparison emulsifying agent (a) | 1.5 |
| triethylamine | 1.0 |
| test benzene (145°-200° boiling range) | 15.0 |
| water | 33.5 |

| Comparison Example (ii) | |
|---|---|
| comparison alkyd resin | 50.0 |
| triethylamine | 4.5 |
| ethylene glycol monobutyl ether | 29.0 |
| water | 16.5 |

The films prepared from the dispersions of the Examples were tested by coating the dispersions on glass plates and drying and curing the resulting film for 7 days in an air-conditioned room at 20° C. and 60° relative humidity. The thickness of the dry films was 30 μm. The film hardness was determined at 24-hour intervals by measuring the pendulum hardness according to DIN 53 157.

The water-resistance was determined by immersing the films dried for 7 days in distilled water of 40° C. and examining them at intervals of 1, 5, 10 and 24 hours after immersion for the formation of blisters and/or for signs of peeling. The examination was based on a 5-point system:

1—film unchanged;
2—beginning of formation of blisters at edge;
3—slight formation of blisters on entire surface;
4—strong formation of blisters on entire film surface;
5—film detached from substrate.

The pendulum hardness and the reaction to distilled water, measured according to the scale above, of the films prepared from the Examples is compiled in the table below:

TABLE

| Example | Pendulum Hardness (DIN 53 157) | | | Water Resistance | | | |
|---|---|---|---|---|---|---|---|
| | Day 1 | Day 3 | Day 7 | 1 h | 5 h | 10 h | 24 h |
| 1 | 25 | 40 | 55 | 1 | 1 | 1-2 | 2-3 |
| 2 | 24 | 38 | 52 | 1 | 1 | 1 | 2 |
| 3 | 26 | 40 | 54 | 1 | 1 | 1-2 | 2-3 |
| 4 | 25 | 39 | 55 | 1 | 1 | 1-2 | 2-3 |
| 5 | 23 | 35 | 52 | 1 | 1 | 1 | 2 |
| Comparison i | 18 | 25 | 39 | 1 | 2 | 3 | 4 |
| Comparison ii | 25 | 40 | 54 | 1 | 2-3 | 4 | 5 |

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. An aqueous-dispersed, film-forming vehicle suitable for lacquers, comprising:
   (a) a water-insoluble air-drying alkyd resin;
   (b) a surfactant consisting essentially of an adduct of allyl glycidyl ether units and ethylene oxide units with a hydrophobic moiety selected from the group consisting of long-chain aliphatic or long-chain alkylphenol moieties; and
   (c) a water-based diluent.

2. The aqueous-dispersed, film-forming vehicle according to claim 1 wherein said adduct is the addition product of allyl glycidyl ether and ethylene oxide to a hydrophobic moiety source selected from the group consisting of fatty acids, fatty alcohols, fatty amines, fatty-acid amides and alkyl phenols wherein said fatty acid groups and said alkyl groups contain from 6 to 26 carbon atoms; said adduct containing 2 to 10 allyl glycidyl units and 5 to 25 ethylene oxide units per mol.

3. The aqueous-dispersed, film-forming vehicle according to claim 1 wherein said air-drying alkyd resin is water-insoluble, has an acid number in the range 5 to 40, and a fatty acid content in the range of 25 to 80 weight %.

4. The aqueous-dispersed, film-forming vehicle according to claim 3 wherein said resin has an acid number in the range from 5 to 25, and a fatty acid content in the range 45 to 70 weight %.

5. The aqueous-dispersed, film-forming vehicle according to claim 2 wherein said hydrophobic moiety is selected from the group consisting of fatty-aliphatic hydrocarbon groups of from 8 to 18 carbon atoms in straight or branched chains and alkylphenols wherein said alkyl group contains 6 to 12 carbon atoms.

6. The aqueous-dispersed, film-forming vehicle according to claim 5 wherein said hydrophobic moiety source is selected from the group consisting of nonylphenol hexadecyl alcohol, decylamine and mixed fatty acids containing the normally occurring double bonds.

7. The aqueous-dispersed, film-forming vehicle according to claim 2 wherein said vehicle contains:
   air-drying alkyd resin—30 to 70%
   surfactant adduct—0.15 to 7%
   water-based diluent q.s.—to 100%.

8. The aqueous-dispersed, film-forming vehicle according to claim 2 wherein said water-based dispersion diluent contains water and, as processing aids, from 0 to 15% of said dispersion, of solvents selected from the group consisting of ethyleneglycol monobutyl ether, butanol, benzene, xylene, and from 0 to 2% of basic nitrogen compounds selected from the group consisting of ammonia, triethylamine and dimethylethanolamine.

9. The aqueous-dispersed, film-forming vehicle according to claim 2 additionally containing coloring pigments and siccatives useful for controlling the drying rates of said alkyd resins.

10. The aqueous-dispersed, film-forming vehicle according to claim 2 diluted with additional water to consistency suitable for application as a lacquer.

11. The hard, water-resistant film of lacquer remaining after evaporation of the water and the air-drying of said resin from films deposited by said vehicles according to claim 2.

12. Composites comprising a substrate coated with a layer of the film according to claim 10.

13. An aqueous-dispersed, film-forming vehicle suitable for lacquers comprising:
   (a) from 30 to 70% by weight based upon the total weight of the aqueous dispersion of at least one air cross-linkable alkyd resin;
   (b) from 0.15 to 7% by weight of said aqueous dispersion of a surface-active compound which is the addition product of 2 to 10 allyl glycidyl units and 5 to 25 ethylene oxide units per mol of a hydrophobic moiety from a source selected from the group consisting of fatty acids, fatty alcohols, fatty amines, fatty acid amides and alkyl phenols wherein said aliphatic groups of said fatty source has a chain of from 6 to 26 carbon atoms and said alkyl groups of said alkylphenol contain from 6 to 26 carbon atoms;
   (c) the remainder being a water-based vehicle comprising an aqueous liquid-phase containing primarily water and, optionally, admixed pigments, siccatives and adjuvant solvents.

* * * * *